(12) United States Patent
Singh (10) Patent No.: US 12,536,270 B2
(45) Date of Patent: Jan. 27, 2026

(54) SYSTEM AND METHOD FOR DYNAMICALLY MERGING GEOFENCING RULES AND MESSAGES

(71) Applicant: Bank of America Corporation, Charlotte, NC (US)

(72) Inventor: Shailendra Singh, Thane West (IN)

(73) Assignee: Bank of America Corporation, Charlotte, NC (US)

( * ) Notice: Subject to any disclaimer, the term of this patent is extended or adjusted under 35 U.S.C. 154(b) by 192 days.

(21) Appl. No.: 18/473,437

(22) Filed: Sep. 25, 2023

(65) Prior Publication Data

US 2025/0103700 A1 Mar. 27, 2025

(51) Int. Cl.
*G06F 21/45* (2013.01)

(52) U.S. Cl.
CPC ................... *G06F 21/45* (2013.01)

(58) Field of Classification Search
CPC ........................................................ G06F 21/45
See application file for complete search history.

(56) References Cited

U.S. PATENT DOCUMENTS

| | | | |
|---|---|---|---|
| 2,021,140 A * | 11/1935 | Birdseye | G01C 11/00 33/1 A |
| 9,264,874 B2 | 2/2016 | Fraccaroli | |
| 9,363,783 B2 | 6/2016 | Rhoads | |
| 9,418,115 B2 | 8/2016 | Ganick et al. | |
| 9,930,670 B2 | 3/2018 | Yi et al. | |
| 10,055,763 B2 | 8/2018 | Scott et al. | |
| 10,341,814 B2 | 7/2019 | Thoresen et al. | |
| 10,600,041 B2 | 3/2020 | Kelly et al. | |
| 10,949,872 B2 | 3/2021 | Andreou | |
| 11,094,202 B2 | 8/2021 | Gong et al. | |
| 11,146,680 B2 | 10/2021 | Leavitt et al. | |
| 11,244,355 B2 | 2/2022 | Walden et al. | |
| 11,316,817 B1 | 4/2022 | Rao | |
| 11,450,196 B2 | 9/2022 | Daoura et al. | |
| 11,543,834 B2 | 1/2023 | Nobukawa et al. | |
| 11,620,666 B2 * | 4/2023 | Sundaresan | H04W 4/021 705/26.3 |
| 2005/0021223 A1 * | 1/2005 | Heaps | G08G 1/0104 701/532 |
| 2012/0033852 A1 * | 2/2012 | Kennedy | G06V 10/7715 382/103 |
| 2012/0077488 A1 * | 3/2012 | Unger | H04W 48/18 455/432.1 |
| 2018/0068567 A1 * | 3/2018 | Gong | H04W 4/022 |
| 2018/0192243 A1 * | 7/2018 | Cornwall | H04W 4/022 |

(Continued)

*Primary Examiner* — Dao Q Ho (57) ABSTRACT

A method includes monitoring a first geographic area and a second geographic area. In response to determining that a portion of the first geographic area overlaps with a portion of the second geographic area, an overlapping geographic area is defined. A merged rule set for the overlapping geographic area is generated by merging a first rule set associated with the first geographic area and a second rule set associated with the second geographic area. In response to determining that a user device is located within the overlapping geographic area, a merged alert is generated based on the merged rule set. The merged alert includes merged information of a first alert associated with the first rule set and a second alert associated with the second rule set. A message with the merged alert is sent to the user device.

17 Claims, 5 Drawing Sheets

(56) References Cited

U.S. PATENT DOCUMENTS

2020/0272741 A1* 8/2020 Bhatia .................. G06F 40/284
2020/0314240 A1* 10/2020 Leavitt ................ H04M 3/5116
2021/0042724 A1 2/2021 Rathod
2021/0211831 A1* 7/2021 Gan ....................... G06N 20/00

* cited by examiner

SYSTEM AND METHOD FOR DYNAMICALLY MERGING GEOFENCING RULES AND MESSAGES

TECHNICAL FIELD

The present disclosure relates generally to geofence management, and more specifically to a system and method for dynamically merging geofencing rules and messages.

BACKGROUND

A geofencing system may provide an opportunity to create a geofence which is a virtual geographical boundary that triggers an action to a mobile device when a user enters or exits the virtual geographical boundary. Geofencing may monitor and provide an alert to a mobile device within the geofence. In particular, geofencing may compare location data from the mobile device with a plurality of coordinate ranges of the geofence to determine whether the device is inside or outside the geofence.

SUMMARY

The system described in the present disclosure provides several practical applications and technical advantages that overcome the current technical problems with geofence management.

In general, a system for dynamically merging geofencing rules and messages includes a geofence management system communicatively coupled to one or more user devices via a network. The geofence management system stores rule sets associated with a plurality of geographic areas. For example, the geofence management system stores a first rule set associated with a first geographic area defined by a first geographic boundary and a second rule set associated with a second geographic area defined by a second geographic boundary. The first rule set may include rules associated with security of interactions performed by the user device while in the first geographic area. The second rule set may include rules associated with security of the interactions performed by the user device while in the second geographic area. The geofence management system monitors geographic boundaries of the plurality of geographic areas. For example, the geofence management system monitors the first geographic boundary of the first geographic area and the second geographic boundary of the second geographic area. In response to determining that a portion of the first geographic area overlaps with a portion of the second geographic area, the geofence management system defines a first overlapping geographic area associated with a first merged geographic boundary. The first merged geographic boundary includes a portion of the first geographic boundary and a portion of the second geographic boundary.

The geofence management system generates a first merged rule set for the first overlapping geographic area by merging the first rule set and the second rule set. The first merged rule set includes rules associated with security of the interactions performed by the user device while in the first overlapping geographic area. Generating the first merged rule set may include executing a machine learning model on the first rule set and the second rule set. The machine learning model is configured to analyze the first rule set and the second rule set and remove redundant information from the first rule set and the second rule set. In response to determining that a user device is located within the first geographic area but not located within the first overlapping geographic area, the geofence management system applies the first rule set in conjunction with interactions performed by the user device while in the first geographic area but not located within the first overlapping geographic area. The geofence management system generates a first alert based on the first rule set and sends a first message with the first alert to the user device.

In response to determining that the user device is located within the second geographic area but not located within the first overlapping geographic area, the geofence management system applies the second rule set in conjunction with interactions performed by the user device while in the second geographic area but not located within the first overlapping geographic area, generates a second alert based on the first rule set, and sends a second message with the second alert to the user device.

In response to determining that the user device is located within the first overlapping geographic area, the geofence management system applies the first merged rule set in conjunction with interactions performed by the user device while in the first overlapping geographic area, generates a first merged alert based on the first merged rule set, and sends a third message with the first merged alert to the user device. The first merged alert includes merged information of the first alert and the second alert.

The geofence management system allows for sending a single message with a merged alert to a user device when the user device enters an overlapping geographic area that includes a portion of a first geographic area and a portion of the second geographic area instead of two separate messages, where a first message includes a first alert that is associated with the first geographic area and a second message includes a second alert that is associated with the second geographic area. Accordingly, by sending the single message with the merged alert to the user device, computing resources (such as, for example, network bandwidth and memory) that would otherwise be utilized when sending multiple messages to the user device may be saved.

Accordingly, the following disclosure is particularly integrated into practical applications of: (1) improving efficiency of geofence management; and (2) improving computing resources utilization of an underlying computing system of a geofence management system.

In one embodiment, a system includes a memory and a processor operably coupled to the memory. The memory is configured to store a first rule set associated with a first geographic area defined by a first geographic boundary and a second rule set associated with a second geographic area defined by a second geographic boundary. The processor is configured to monitor the first geographic boundary of the first geographic area, monitor the second geographic boundary of the second geographic area, and determine that a portion of the first geographic area overlaps with a portion of the second geographic area. In response to determining that the portion of the first geographic area overlaps with the portion of the second geographic area, the processor is further configured to define a first overlapping geographic area associated with a first merged geographic boundary, generate a first merged rule set for the first overlapping geographic area by merging the first rule set and the second rule set, and store the first merged rule set in the memory. The first merged geographic boundary includes a portion of the first geographic boundary and a portion of the second geographic boundary. The processor is further configured to determine that a user device is located within the first geographic area but not located within the first overlapping geographic area. In response to determining that the user device is located within the first geographic area but not located within the first overlapping geographic area, the processor is further configured to apply the first rule set in conjunction with interactions performed by the user device while in the first geographic area but not located within the first overlapping geographic area, generate a first alert based on the first rule set, and send a first message with the first alert to the user device. The processor is further configured to determine that the user device is located within the second geographic area but not located within the first overlapping geographic area. In response to determining that the user device is located within the second geographic area but not located within the first overlapping geographic area, the processor is further configured to apply the second rule set in conjunction with interactions performed by the user device while in the second geographic area but not located within the first overlapping geographic area, generate a second alert based on the first rule set, and send a second message with the second alert to the user device. The processor is further configured to determine that the user device is located within the first overlapping geographic area. In response to determining that the user device is located within the first overlapping geographic area, the processor is further configured to apply the first merged rule set in conjunction with interactions performed by the user device while in the first overlapping geographic area, generate a first merged alert based on the first merged rule set, the first merged alert including merged information of the first alert and the second alert, and send a third message with the first merged alert to the user device.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, where like reference numerals represent like parts.

DETAILED DESCRIPTION

Figure 1:
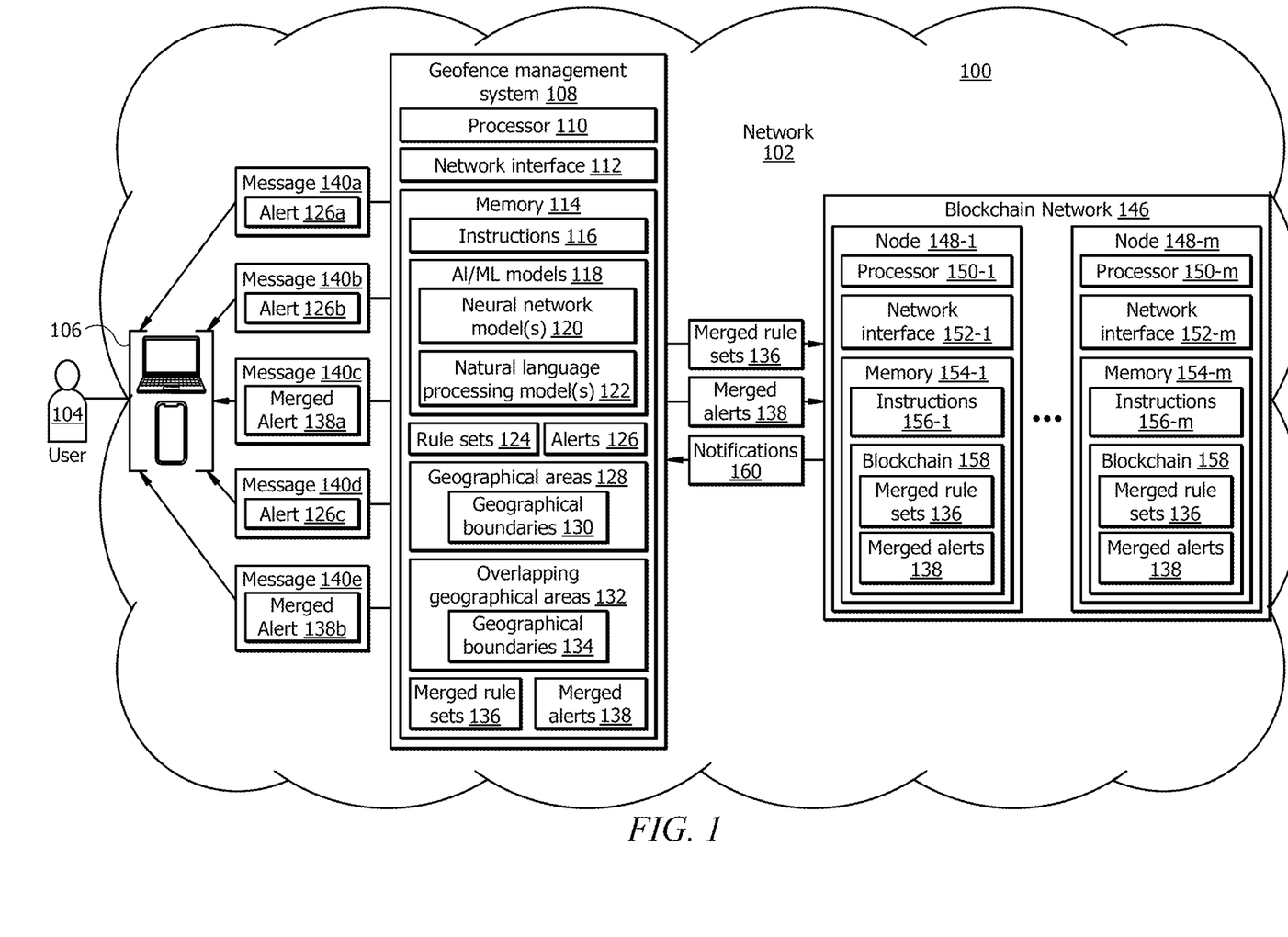
FIG. 1 illustrates an embodiment of a system configured for dynamically merging geofencing rules and messages.

As described above, previous technologies fail to provide efficient and reliable solutions for geofence management. Embodiments of the present disclosure and its advantages may be understood by referring to FIGS. 1, 2A, 2B, 3A, and 3B. FIGS. 1, 2A, 2B, 3A and 3B are used to describe a system and method for dynamically merging geofencing rules and messages.
System Overview FIG. 1 illustrates an embodiment of a system 100 that is generally configured for dynamically merging geofencing rules and messages. In certain embodiments, the system 100 comprises a geofence management system 108 that is operably coupled to a user device 106 of a user 104 and a blockchain network 146 via a network 102. Network 102 enables the communication between the components of the system 100. The blockchain network 146 comprises a peer-to-peer network of nodes 148-1 through 148-$m$. In other embodiments, system 100 may not have all the components listed and/or may have other elements instead of, or in addition to, those listed above.

Figure 2A:
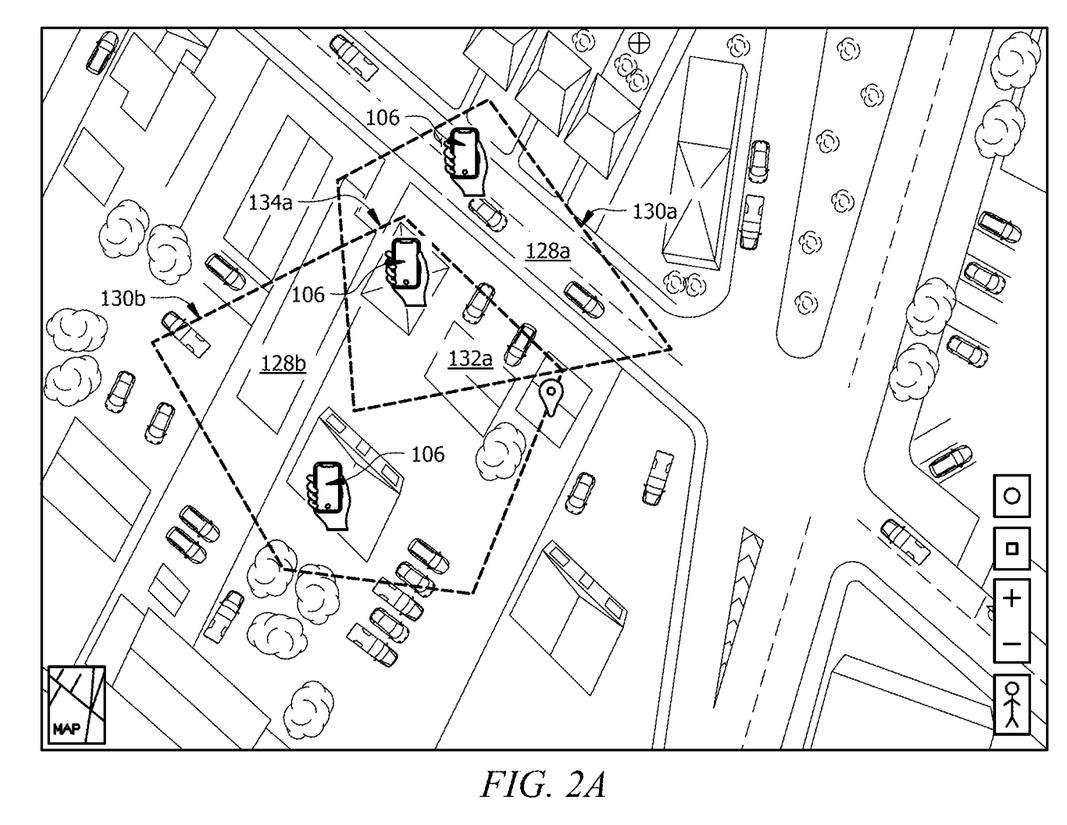
FIG. 2A illustrates an embodiment of a map with two geofences.

In general, the geofence management system 108 monitors the plurality of geographic areas 128. In certain embodiments, the plurality of geographic areas 128 includes a first geographic area 128a and a second geographic area 128b as illustrated in FIG. 2A. In response to determining that the first geographic area 128a overlaps with the second geographic area 128b, the geofence management system 108 defines a first overlapping geographic area 132a (see FIG. 2A) associated with a first merged geographic boundary 134a (see FIG. 2A).

The geofence management system 108 generates a first merged rule set (e.g., a respective one of merged rule sets 136) for the first overlapping geographic area 132a by merging a first rule set (e.g., a respective one of rule sets 124) associated with the first geographic area 128a and a second rule set (e.g., a respective one of rule sets 124) associated with the first geographic area 128a. The geofence management system 108 sends the first merged rule set (e.g., a respective one of merged rule sets 136) to the blockchain network 146 for validation and receives a notification 160 from the blockchain network 146 that the first merged rule set (e.g., a respective one of merged rule sets 136) is valid. In response to receiving the notification 160 from the blockchain network 146 that the first merged rule set (e.g., a respective one of merged rule sets 136) is valid, the processor 110 of the geofence management system 108 stores the first merged rule set (e.g., a respective one of merged rule sets 136) in the geofence management system 108.

The geofence management system 108 determines that the user device 106 is located within the first geographic area 128a but not within the first overlapping geographic area 132a. In response to determining that the user device 106 is located within the first geographic area 128a but not within the first overlapping geographic area 132a, the geofence management system 108 applies the first rule set (e.g., a respective one of rule sets 124) in conjunction with interactions performed by the user device 106 while in the first geographic area 128a but not located within the first overlapping geographic area 132a, generates a first alert 126a based on the first rule set (e.g., a respective one of rule sets 124), and sends a first message 140a with the first alert 126a to the user device 106.

In response to determining that the user device 106 is not located within a portion of the first geographic area 128a that does not overlap with the second geographic area 128b, the geofence management system 108 determines that the user device 106 is located within the second geographic area 128b but not within the first overlapping geographic area 132a. In response to determining that the user device 106 is located within the second geographic area 128b but not within the first overlapping geographic area 132a, the geofence management system 108 applies the second rule set (e.g., a respective one of rule sets 124) in conjunction with interactions performed by the user device 106 while in the second geographic area 128b but not located within the first overlapping geographic area 132a, generates a second alert 126b based on the second rule set (e.g., a respective one of rule sets 124), and sends a second message 140*b* with the second alert 126*b* to the user device 106.

In response to determining that the user device 106 is not located within a portion of the second geographic area 128*b* that does not overlap with the first geographic area 128*a*, the geofence management system 108 determines that the user device 106 is located within the first overlapping geographic area 132*a*. In response to determining that the user device 106 is located within the first overlapping geographic area 132*a*, the geofence management system 108 applies the first merged rule set (e.g., a respective one of merged rule sets 136) in conjunction with interactions performed by the user device 106 while in the first overlapping geographic area 132*a* and generates a first merged alert 138*a* based on the first merged rule set (e.g., a respective one of merged rule sets 136). The geofence management system 108 sends the first merged alert 138*a* to the blockchain network 146 for validation and receives a notification 160 from the blockchain network 146 that the first merged alert 138*a* is valid. In response to receiving the notification 160 from the blockchain network 146 that the first merged alert 138*a* is valid, the geofence management system 108 sends a third message 140*d* with the first merged alert 138*a* to the user device 106.

Figure 2B:
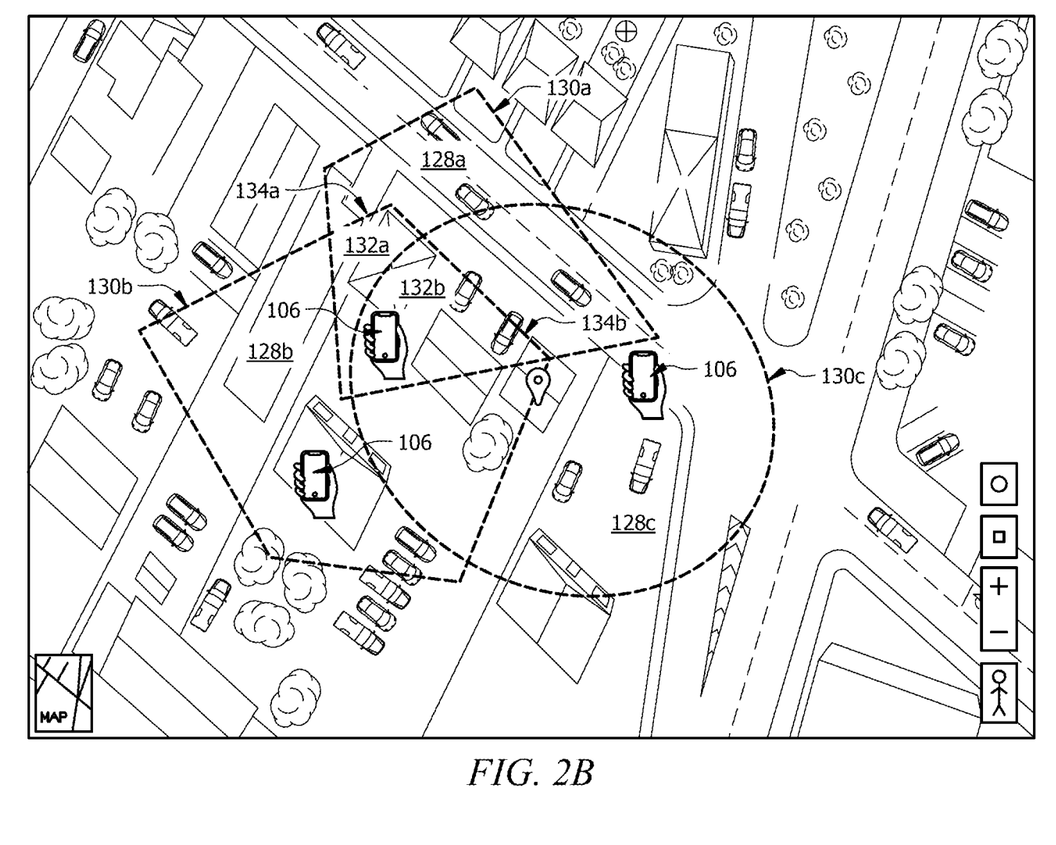
FIG. 2B illustrates an embodiment of a map with three geofences.

In other embodiments, the plurality of geographic areas 128 includes a first geographic area 128*a*, a second geographic area 128*b*, a third geographic area 128*c* as illustrated in FIG. 2B. In such embodiments, the geofence management system 108 monitors the first overlapping geographic area 132*a* and the third geographic area 128*c*. The third geographic area 128*c* is defined by a third geographic boundary 130*c* (see FIG. 2B). The geofence management system 108 determines that the first overlapping geographic area 132*a* overlaps with the third geographic area 128*c*. In response to determining that the first overlapping geographic area 132*a* overlaps with the third geographic area 128*c*, the geofence management system 108 defines a second overlapping geographic area 132*b* associated with a second merged geographic boundary 134*b* (see FIG. 2B).

The geofence management system 108 generates a second merged rule set (e.g., a respective one of merged rule sets 136) for the second overlapping geographic area 132*b* by merging the first merged rule set (e.g., a respective one of merged rule sets 136) associated with the first overlapping geographic area 132*a* and a third rule set (e.g., a respective one of rule sets 124) associated with the third geographic area 128*c*. The geofence management system 108 sends the second merged rule set (e.g., a respective one of merged rule sets 136) to the blockchain network 146 for validation and receives a notification 160 from the blockchain network 146 that the second merged rule set (e.g., a respective one of merged rule sets 136) is valid. In response to receiving the notification 160 from the blockchain network 146 that the second merged rule set (e.g., a respective one of merged rule sets 136) is valid, the geofence management system 108 stores the second merged rule set (e.g., a respective one of merged rule sets 136) in the geofence management system 108.

The processor 110 of the geofence management system 108 determines that the user device 106 is located within the third geographic area 128*c* but not within the second overlapping geographic area 132*b*. In response to determining that the user device 106 is located within the third geographic area 128*c* but not within the second overlapping geographic area 132*b*, the geofence management system 108 applies the third rule set (e.g., a respective one of rule sets 124) in conjunction with interactions performed by the user device 106 while in the third geographic area 128*c* but not located within the second overlapping geographic area 132*b* and generates a third alert 126*c* based on the second rule set (e.g., a respective one of rule sets 124). The geofence management system 108 sends a fourth message 140*s* with the third alert 126*c* to the user device 106.

In response to determining that the user device 106 is not located within a portion of the third geographic area 128*c* that does not overlap with the first overlapping geographic area 132*a*, the geofence management system 108 determines that the user device 106 is located within the second overlapping geographic area 132*b*. In response to determining that the user device 106 is located within the second overlapping geographic area 132*b*, the geofence management system 108 applies the second merged rule set (e.g., a respective one of merged rule sets 136) in conjunction with interactions performed by the user device 106 while in the second overlapping geographic area 132*b* and generates a second merged alert 138*b* based on the second merged rule set (e.g., a respective one of merged rule sets 136). The geofence management system 108 sends the second merged alert 138*b* to the blockchain network 146 for validation and receives a notification 160 from the blockchain network 146 that the second merged alert 138*b* is valid. In response to receiving the notification 160 from the blockchain network 146 that the second merged alert 138*b* is valid, the geofence management system 108 sends a fifth message 140*e* with the second merged alert 138*b* to the user device 106.

System Components

Network

Network 102 may be any suitable type of wireless and/or wired network. Network 102 may or may not be connected to the Internet or public network. Network 102 may include all or a portion of an Intranet, a peer-to-peer network, a switched telephone network, a local area network (LAN), a wide area network (WAN), a metropolitan area network (MAN), a personal area network (PAN), a wireless PAN (WPAN), an overlay network, a software-defined network (SDN), a virtual private network (VPN), a mobile telephone network (e.g., cellular networks, such as 4G or 5G), a plain old telephone (POT) network, a wireless data network (e.g., WiFi, WiGig, WiMax, etc.), a long-term evolution (LTE) network, a universal mobile telecommunications system (UMTS) network, a peer-to-peer (P2P) network, a Bluetooth network, a near field communication (NFC) network, and/or any other suitable network. Network 102 may be configured to support any suitable type of communication protocol as would be appreciated by one of ordinary skill in the art.

User Device

The user device 106 is generally any device that is configured to process data and interact with the user 104. Examples of the user device 106 include, but are not limited to, a personal computer, a desktop computer, a workstation, a server, a laptop, a tablet computer, a mobile phone (such as a smartphone), a virtual reality headset, etc. The user device 106 may include a user interface, such as a display, a microphone, keypad, or other appropriate terminal equipment usable by the user 104. The user device 106 may include a hardware processor, memory, and/or circuitry (not explicitly shown) configured to perform any of the functions or actions of the user device 106 described herein. For example, software applications designed using software code may be stored in the memory and executed by the processor to perform the functions of the user device 106. The user device 106 is configured to communicate with other components of the system 100 via the network 102. In operation, the user device 106 is configured to receive messages (e.g., messages 140a through 104c) from the geofence management system 108 when the user device 106 moves between geofences (e.g., geographic areas 128a, 128b, and 132a of FIG. 2A).

Geofence Management System

The geofence management system 108 is generally any device that is configured to process data and communicate with other components of the system 100 via the network 102. The geofence management system 108 may comprise a processor 110 in signal communication with a memory 114 and a network interface 112.

Processor 110 comprises one or more processors operably coupled to the memory 114. Processor 110 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). Processor 110 may be a programmable logic device, a microcontroller, a microprocessor, or any suitable combination of the preceding. The one or more processors are configured to process data and may be implemented in hardware or software. Processor 110 may be 8-bit, 16-bit, 32-bit, 64-bit, or of any other suitable architecture. The one or more processors are configured to implement various software instructions to perform the operations described herein. For example, the one or more processors are configured to execute software instructions 116 and artificial intelligence/machine learning (AI/ML) models 118 to perform one or more functions of the geofence management system 108 described herein.

Network interface 112 is configured to enable wired and/or wireless communications (e.g., via network 102). Network interface 112 is configured to communicate data between the geofence management system 108 and other components of the system 100. For example, network interface 112 may comprise a WIFI interface, a local area network (LAN) interface, a wide area network (WAN) interface, a modem, a switch, or a router. Processor 110 is configured to send and receive data using the network interface 112. Network interface 112 may be configured to use any suitable type of communication protocol as would be appreciated by one of ordinary skill in the art.

The memory 114 comprises a non-transitory computer-readable medium such as one or more disks, tape drives, or solid-state drives, and may be used as an over-flow data storage device, to store programs when such programs are selected for execution, and to store instructions and data that are read during program execution. Memory 114 may be volatile or non-volatile and may comprise a read-only memory (ROM), random-access memory (RAM), ternary content-addressable memory (TCAM), dynamic random-access memory (DRAM), and static random-access memory (SRAM). Memory 114 may be implemented using one or more disks, tape drives, solid-state drives, and/or the like. Memory 114 may store any of the information described in FIGS. 1, 2A, 2B, 3A, and 3B along with any other data, instructions, logic, rules, or code operable to implement the function(s) described herein. Memory 114 is operable to store software instructions 116, AI/ML models 118, and/or any other data and instructions. The software instructions 116 may comprise any suitable set of software instructions, logic, rules, or code operable to be executed by processor 110. The AI/ML models 118 may comprise one or more neural network models 120 and one or more natural language processing (NLP) models 122 that operable to be executed by processor 110. One or more neural network models 120 may comprise a recurrent neural network (RNN), or the like.

Memory 114 is further operable to store a plurality of geographic boundaries 130 that define respective geographic areas 128. In certain embodiments, each of the geographic boundaries 130 comprises a series of location coordinates. Memory 114 is further operable to store a plurality of rule sets 124 for the geographic areas 128. In certain embodiments, each of the rule sets 124 comprises rules associated with security of interactions performed by the user device 106 while in a respective one of the geographic areas 128. In certain embodiments, the interactions performed by the user device 106 include receiving location-based services over network 102.

In operation, the processor 110 of the geofence management system 108 monitors the plurality of geographic areas 128. In certain embodiments, the plurality of geographic areas 128 includes a first geographic area 128a and a second geographic area 128b as illustrated in FIG. 2A. The first geographic area 128a is defined by a first geographic boundary 130a and the second geographic area 128b is defined by a second geographic boundary 130b. Each of the first geographic boundary 130a and the second geographic boundary 130b comprises a series of location coordinates. In certain embodiments, the monitoring process comprises executing by, the processor 110 of the geofence management system 108, an AI/ML model 118 to monitor the first geographic boundary 130a and the second geographic boundary 130b. The AI/ML model 118 may comprise one or more neural network models 120 such as a recurrent neural network (RNN).

The processor 110 of the geofence management system 108 determines that the first geographic area 128a overlaps with the second geographic area 128b. In response to determining that the first geographic area 128a overlaps with the second geographic area 128b, the processor 110 of the geofence management system 108 defines a first overlapping geographic area 132a (see FIG. 2A) associated with a first merged geographic boundary 134a (see FIG. 2A). In certain embodiments, the first merged geographic boundary 134a comprises a portion of the first geographic boundary 130a and a portion of the second geographic boundary 130b.

The processor 110 of the geofence management system 108 generates a first merged rule set (e.g., a respective one of merged rule sets 136) for the first overlapping geographic area 132a by merging a first rule set (e.g., a respective one of rule sets 124) associated with the first geographic area 128a and a second rule set (e.g., a respective one of rule sets 124) associated with the first geographic area 128a. The first rule set (e.g., a respective one of rule sets 124) may comprise rules associated with security of the interactions performed by the user device 106 while in the first geographic area 128a. The second rule set (e.g., a respective one of rule sets 124) may comprise rules associated with security of the interactions performed by the user device 106 while in the second geographic area 128b. The first merged rule set (e.g., a respective one of merged rule sets 136) may comprise rules associated with security of the interactions performed by the user device 106 while in the first overlapping geographic area 132a. In certain embodiments, the interactions performed by the user device 106 include receiving location-based services over network 102.

In certain embodiments, generating the first merged rule set (e.g., a respective one of merged rule sets 136) comprises executing, by the processor 110 of the geofence management system 108, an AI/ML model 118 on the first rule set (e.g., a respective one of rule sets 124) and the second rule set (e.g., a respective one of rule sets). In certain embodiments, the AI/ML model 118 is configured to analyze the first rule set (e.g., a respective one of rule sets 124) and the second rule set (e.g., a respective one of rule sets 124) set and remove redundant information from the first rule set (e.g., a respective one of rule sets 124) and the second rule set (e.g., a respective one of rule sets 124). The AI/ML model 118 may comprise one or more NLP models 122.

The processor 110 of the geofence management system 108 sends the first merged rule set (e.g., a respective one of merged rule sets 136) to the blockchain network 146 for validation and receives a notification 160 from the blockchain network 146 that the first merged rule set (e.g., a respective one of merged rule sets 136) is valid. In response to receiving the notification 160 from the blockchain network 146 that the first merged rule set (e.g., a respective one of merged rule sets 136) is valid, the processor 110 of the geofence management system 108 stores the first merged rule set (e.g., a respective one of merged rule sets 136) in the memory 114 of the geofence management system 108.

The processor 110 of the geofence management system 108 determines that the user device 106 is located within the first geographic area 128a but not within the first overlapping geographic area 132a. The processor 110 of the geofence management system 108 may determine a location of the user device 106 based at least in part upon GPS coordinates of the user device 106 at a particular time. In certain embodiments, the processor 110 of the geofence management system 108 determines that the user device 106 is located within the first geographic area 128a but not within the first overlapping geographic area 132a based at least in part upon the GPS coordinates of the user device 106 in relation to the series of location coordinates of the first geographic boundary 130a and the series of location coordinates of the first merged geographic boundary 134a.

In response to determining that the user device 106 is located within the first geographic area 128a but not within the first overlapping geographic area 132a, the processor 110 of the geofence management system 108 applies the first rule set (e.g., a respective one of rule sets 124) in conjunction with interactions performed by the user device 106 while in the first geographic area 128a but not located within the first overlapping geographic area 132a, generates a first alert 126a based on the first rule set (e.g., a respective one of rule sets 124), and sends a first message 140a with the first alert 126a to the user device 106. For example, the first alert 126a may comprise "You are entering a location prone to fraud."

In response to determining that the user device 106 is not located within a portion of the first geographic area 128a that does not overlap with the second geographic area 128b, the processor 110 of the geofence management system 108 determines that the user device 106 is located within the second geographic area 128b but not within the first overlapping geographic area 132a. In certain embodiments, the processor 110 of the geofence management system 108 determines that the user device 106 is located within the second geographic area 128b but not within the first overlapping geographic area 132a based at least in part upon the GPS coordinates of the user device 106 in relation to the series of location coordinates of the second geographic boundary 130b and the series of location coordinates of the first merged geographic boundary 134a.

In response to determining that the user device 106 is located within the second geographic area 128b but not within the first overlapping geographic area 132a, the processor 110 of the geofence management system 108 applies the second rule set (e.g., a respective one of rule sets 124) in conjunction with interactions performed by the user device 106 while in the second geographic area 128b but not located within the first overlapping geographic area 132a, generates a second alert 126b based on the second rule set (e.g., a respective one of rule sets 124), and sends a second message 140b with the second alert 126b to the user device 106. For example, the second alert 126b may comprise "You are entering a location prone to radio frequency attacks."

In response to determining that the user device 106 is not located within a portion of the second geographic area 128b that does not overlap with the first geographic area 128a, the processor 110 of the geofence management system 108 determines that the user device 106 is located within the first overlapping geographic area 132a. In certain embodiments, the processor 110 of the geofence management system 108 determines that the user device 106 is located within the first overlapping geographic area 132a based at least in part upon the GPS coordinates of the user device 106 in relation to the series of location coordinates of the first merged geographic boundary 134a.

In response to determining that the user device 106 is located within the first overlapping geographic area 132a, the processor 110 of the geofence management system 108 applies the first merged rule set (e.g., a respective one of merged rule sets 136) in conjunction with interactions performed by the user device 106 while in the first overlapping geographic area 132a and generates a first merged alert 138a based on the first merged rule set (e.g., a respective one of merged rule sets 136). In certain embodiments, the first merged alert 138a comprises merged information of the first alert 126a and the second alert 126b. For example, the first merged alert 138a may comprise "You are entering a location prone to fraud and radio frequency attacks." The processor 110 of the geofence management system 108 sends the first merged alert 138a to the blockchain network 146 for validation and receives a notification 160 from the blockchain network 146 that the first merged alert 138a is valid. In response to receiving the notification 160 from the blockchain network 146 that the first merged alert 138a is valid, the processor 110 of the geofence management system 108 sends a third message 140d with the first merged alert 138a to the user device 106.

In other embodiments, the plurality of geographic areas 128 includes a first geographic area 128a, a second geographic area 128b, a third geographic area 128c as illustrated in FIG. 2B. In such embodiments, the processor 110 of the geofence management system 108 monitors the first overlapping geographic area 132a and the third geographic area 128c. The third geographic area 128c is defined by a third geographic boundary 130c (see FIG. 2B). The third geographic boundary 130c comprises a series of location coordinates. In certain embodiments, the monitoring process comprises executing by, the processor 110 of the geofence management system 108, an AI/ML model 118 to monitor the first merged geographic boundary 134a and the third geographic boundary 130c. The AI/ML model 118 may comprise one or more neural network models 120 such as a recurrent neural network (RNN).

The processor 110 of the geofence management system 108 determines that the first overlapping geographic area 132a overlaps with the third geographic area 128c. In response to determining that the first overlapping geographic area 132a overlaps with the third geographic area 128c, the processor 110 of the geofence management system 108 defines a second overlapping geographic area 132b associated with a second merged geographic boundary 134*b* (see FIG. 2B). In certain embodiments, the second merged geographic boundary 134*b* comprises a portion of the first merged geographic boundary 134*a* and a portion of the third geographic boundary 130*c*.

The processor 110 of the geofence management system 108 generates a second merged rule set (e.g., a respective one of merged rule sets 136) for the second overlapping geographic area 132*b* by merging the first merged rule set (e.g., a respective one of merged rule sets 136) associated with the first overlapping geographic area 132*a* and a third rule set (e.g., a respective one of rule sets 124) associated with the third geographic area 128*c*. The third rule set (e.g., a respective one of rule sets 124) may comprise rules associated with security of the interactions performed by the user device 106 while in the third geographic area 128*c*. The second merged rule set (e.g., a respective one of merged rule sets 136) may comprise rules associated with security of the interactions performed by the user device 106 while in the second overlapping geographic area 132*b*.

In certain embodiments, generating the second merged rule set (e.g., a respective one of merged rule sets 136) comprises executing, by the processor 110 of the geofence management system 108, an AI/ML model 118 on the first merged rule set (e.g., a respective one of merged rule sets 136) and the third rule set (e.g., a respective one of rule sets 124). In certain embodiments, the AI/ML model 118 is configured to analyze the first merged rule set (e.g., a respective one of merged rule sets 136) and the third rule set (e.g., a respective one of rule sets 124) and remove redundant information from the first merged rule set (e.g., a respective one of merged rule sets 136) and the third rule set (e.g., a respective one of rule sets 124). The AI/ML model 118 may comprise one or more NLP models 122.

The processor 110 of the geofence management system 108 sends the second merged rule set (e.g., a respective one of merged rule sets 136) to the blockchain network 146 for validation and receives a notification 160 from the blockchain network 146 that the second merged rule set (e.g., a respective one of merged rule sets 136) is valid. In response to receiving the notification 160 from the blockchain network 146 that the second merged rule set (e.g., a respective one of merged rule sets 136) is valid, the processor 110 of the geofence management system 108 stores the second merged rule set (e.g., a respective one of merged rule sets 136) in the memory 114 of the geofence management system 108.

The processor 110 of the geofence management system 108 determines that the user device 106 is located within the third geographic area 128*c* but not within the second overlapping geographic area 132*b*. In certain embodiments, the processor 110 of the geofence management system 108 determines that the user device 106 is located within the third geographic area 128*c* but not within the second overlapping geographic area 132*b* based at least in part upon the GPS coordinates of the user device 106 in relation to the series of location coordinates of the third geographic boundary 130*c* and the series of location coordinates of the second merged geographic boundary 134*b*.

In response to determining that the user device 106 is located within the third geographic area 128*c* but not within the second overlapping geographic area 132*b*, the processor 110 of the geofence management system 108 applies the third rule set (e.g., a respective one of rule sets 124) in conjunction with interactions performed by the user device 106 while in the third geographic area 128*c* but not located within the second overlapping geographic area 132*b* and generates a third alert 126*c* based on the second rule set (e.g., a respective one of rule sets 124). For example, the third alert 126*c* may comprise "You are entering a location with compromised WiFi hotspots." The processor 110 of the geofence management system 108 sends a fourth message 140*s* with the third alert 126*c* to the user device 106.

In response to determining that the user device 106 is not located within a portion of the third geographic area 128*c* that does not overlap with the first overlapping geographic area 132*a*, the processor 110 of the geofence management system 108 determines that the user device 106 is located within the second overlapping geographic area 132*b*. In certain embodiments, the processor 110 of the geofence management system 108 determines that the user device 106 is located within the second overlapping geographic area 132*b* based at least in part upon the GPS coordinates of the user device 106 in relation to the series of location coordinates of the second merged geographic boundary 134*b*.

In response to determining that the user device 106 is located within the second overlapping geographic area 132*b*, the processor 110 of the geofence management system 108 applies the second merged rule set (e.g., a respective one of merged rule sets 136) in conjunction with interactions performed by the user device 106 while in the second overlapping geographic area 132*b* and generates a second merged alert 138*b* based on the second merged rule set (e.g., a respective one of merged rule sets 136). In certain embodiments, the second merged alert 138*b* comprises merged information of the first merged alert 138*a* and the third alert 126*c*. For example, the second merged alert 138*b* may comprise "You are entering a location prone to fraud, radio frequency attacks, and with compromised WiFi hotspots." The processor 110 of the geofence management system 108 sends the second merged alert 138*b* to the blockchain network 146 for validation and receives a notification 160 from the blockchain network 146 that the second merged alert 138*b* is valid. In response to receiving the notification 160 from the blockchain network 146 that the second merged alert 138*b* is valid, the processor 110 of the geofence management system 108 sends a fifth message 140*e* with the second merged alert 138*b* to the user device 106.

Blockchain Network

The blockchain network 146 comprises a peer-to-peer network of nodes 148-1 through 148-*m* and is configured to validate merged rule sets 136 and merged alerts 138 received from the geofence management system 108. The blockchain network 146 is further configured to store the merged rule sets 136 and to merged alerts 138 in a blockchain 158 of the blockchain network 146.

Each of the nodes 148-1 through 148-*m* is generally any device that is configured to process data and communicate with other components of the system 100 via the network 102. Each of the nodes 148-1 through 148-*m* comprises a respective one of processors 150-1 through 150-*m* in signal communication with a respective one of memories 154-1 through 154-*m* and a respective one of network interfaces 152-1 through 152-*m*. Each of the processors 150-1 through 150-*m* may comprise one or more processors operably coupled to a respective one of the memories 114.

Each of the processors 150-1 through 150-*m* is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). Each of the processors 150-1 through 150-*m* may be a programmable logic device, a microcontroller, a microprocessor, or any suitable combination of the preceding. The one or more processors are configured to process data and may be implemented in hardware or software. For example, each of the processors 150-1 through 150-*m* may be 8-bit, 16-bit, 32-bit, 64-bit, or of any other suitable architecture. Each of the processors 150-1 through 150-*m* is configured to implement various software instructions. For example, each of the processors 150-1 through 150-*m* is configured to execute respective ones of software instructions 156-1 through 156-*m* that are stored in a respective one of the memories 154-1 through 154-*m* in order to perform the operations described herein.

Each of the network interfaces 152-1 through 152-*m* is configured to enable wired and/or wireless communications (e.g., via network 102). Each of the network interfaces 152-1 through 152-*m* is configured to communicate data between a respective one of the nodes 148-1 through 148-*m* and other components of the system 100. For example, each of the network interfaces 152-1 through 152-*m* may comprise a WIFI interface, a local area network (LAN) interface, a wide area network (WAN) interface, a modem, a switch, or a router. Each of the network interfaces 152-1 through 152-*m* may be configured to use any suitable type of communication protocol as would be appreciated by one of ordinary skill in the art.

Each of the memories 154-1 through 154-*m* comprises a non-transitory computer-readable medium such as one or more disks, tape drives, or solid-state drives, and may be used as an over-flow data storage device, to store programs when such programs are selected for execution, and to store instructions and data that are read during program execution. Each of the memories 154-1 through 154-*m* may be volatile or non-volatile and may comprise a read-only memory (ROM), random-access memory (RAM), ternary content-addressable memory (TCAM), dynamic random-access memory (DRAM), and static random-access memory (SRAM). Each of the memories 154-1 through 154-*m* may be implemented using one or more disks, tape drives, solid-state drives, and/or the like. Each of the memories may store any of the information described in FIGS. 1, 2A, 2B, 3A, and 3B along with any other data, instructions, logic, rules, or code operable to implement the function(s) described herein. Each of the memories 154-1 through 154-*m* is operable to store respective ones of software instructions 156-1 through 156-*m*, and/or any other data and instructions. Each of the software instructions 156-1 through 156-*m* may comprise any suitable set of software instructions, logic, rules, or code operable to be executed by respective one of the processors 150-1 through 150-*m*. Each of the memories 154-1 through 154-*m* is further configured to store a copy of a blockchain 158. Each copy of the blockchain 158 stores the merged rule sets 136 and the merged alerts 138.

In operation, the blockchain network 146 is configured to receive merged rule sets 136 and merged alerts 138 from the geofence management system 108 for validation and send notifications 160 to the geofence management system 108 upon validating the merged rule sets 136 and the merged alerts 138.

Example Method for Dynamically Merging Geofencing Rules and Messages

Figure 3A:
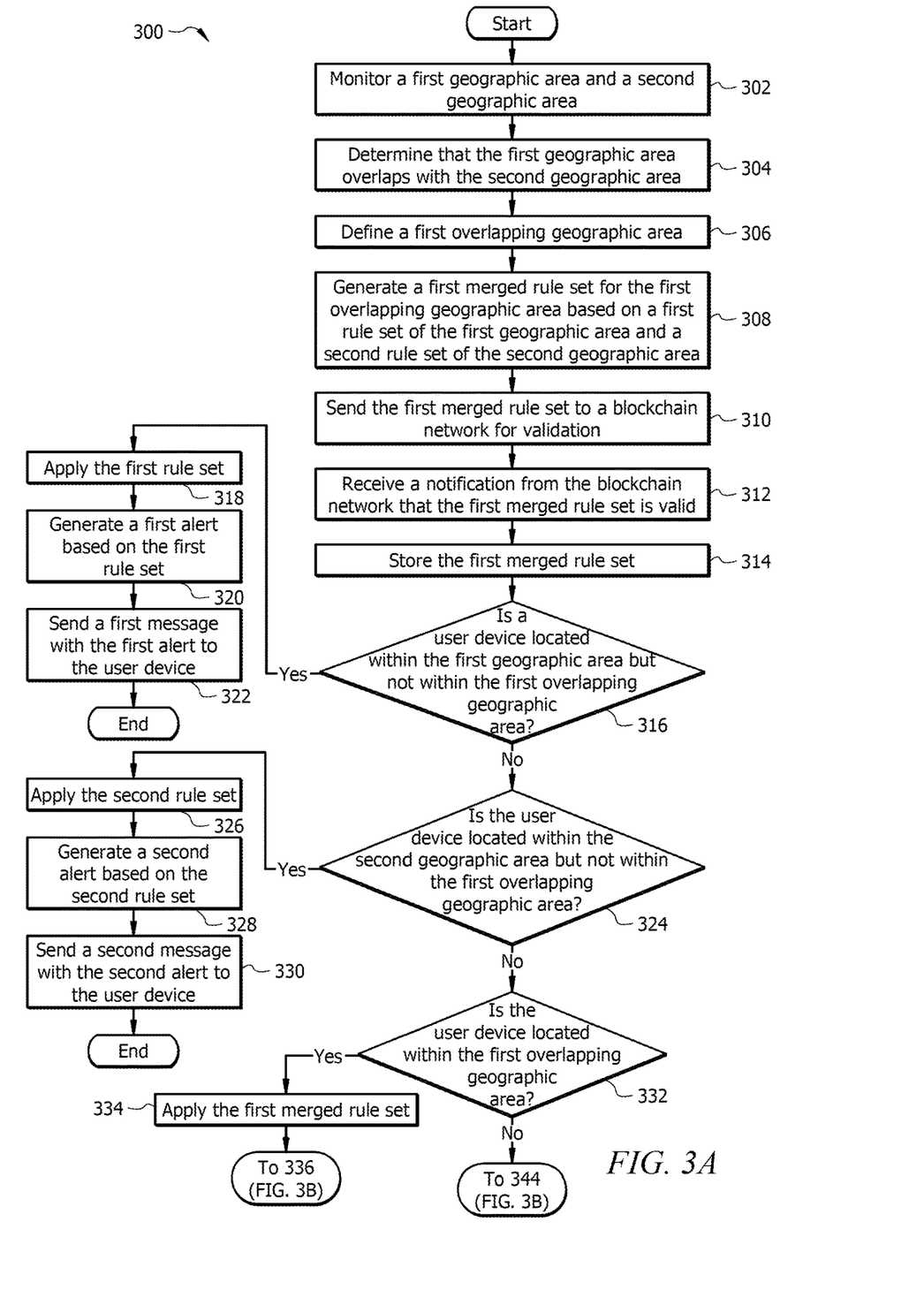
FIGS. 3A and 3B illustrate an example operational flow of system of FIG. 1 for dynamically merging geofencing rules and messages.
Figure 3B:
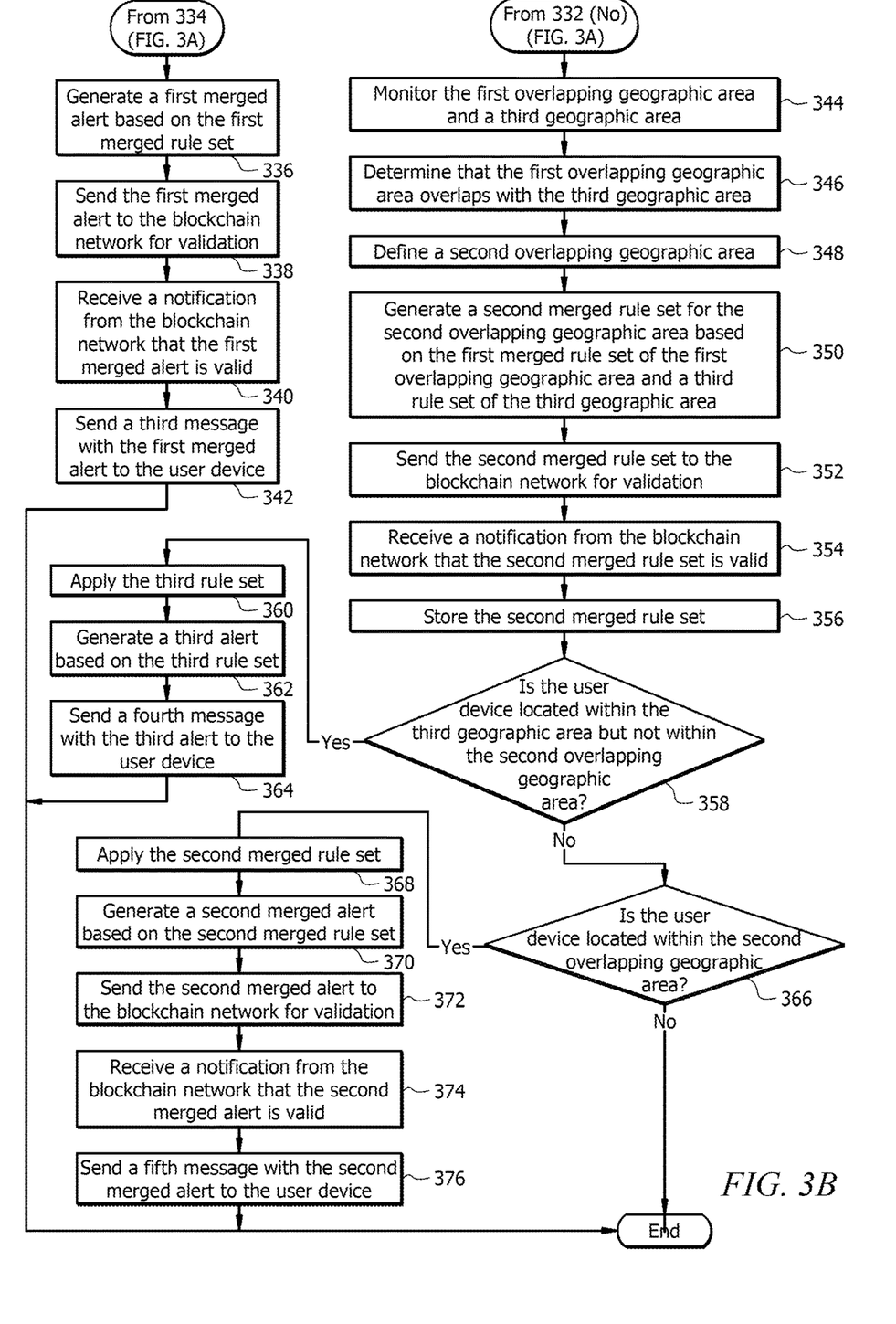

FIGS. 3A and 3B illustrate an example flowchart of a method 300 for dynamically merging geofencing rules and messages. Modifications, additions, or omissions may be made to method 300. Method 300 may include more, fewer, or other operations. For example, operations may be performed in parallel or in any suitable order. For example, one or more operations of method 300 may be implemented, at least in part, in the form of the software instructions (e.g., software instructions 116, 156-1 through 156-*m*, and/or AI/ML models 118 of FIG. 1), stored on non-transitory, tangible, machine-readable medium (e.g., memories 114 and/or 154-1 through 154-*m* of FIG. 1) that when executed by one or more processors (e.g., processors 110 and/or 150-1 through 150-*m* of FIG. 1) may cause the one or more processors to perform operations 302-376.

Method 300 starts with operation 302, where a processor 110 of a geofence management system 108 (see FIG. 1) monitors a first geographic area 128*a* and a second geographic area 128*b* (see FIG. 2A). The first geographic area 128*a* is defined by a first geographic boundary 130*a* and the second geographic area 128*b* is defined by a second geographic boundary 130*b*. Each of the first geographic boundary 130*a* and the second geographic boundary 130*b* comprises a series of location coordinates. In certain embodiments, the monitoring process comprises executing by, the processor 110 of the geofence management system 108, an AI/ML model 118 (see FIG. 1) to monitor the first geographic boundary 130*a* and the second geographic boundary 130*b*. The AI/ML model 118 may comprise one or more neural network models 120 (see FIG. 1) such as a recurrent neural network (RNN).

At operation 304, the processor 110 of the geofence management system 108 determines that the first geographic area 128*a* overlaps with the second geographic area 128*b*.

At operation 306, in response to determining that the first geographic area 128*a* overlaps with the second geographic area 128*b*, the processor 110 of the geofence management system 108 defines a first overlapping geographic area 132*a* (see FIG. 2A) associated with a first merged geographic boundary 134*a* (see FIG. 2A). In certain embodiments, the first merged geographic boundary 134*a* comprises a portion of the first geographic boundary 130*a* and a portion of the second geographic boundary 130*b*.

At operation 308, the processor 110 of the geofence management system 108 generates a first merged rule set (e.g., a respective one of merged rule sets 136 of FIG. 1) for the first overlapping geographic area 132*a* by merging a first rule set (e.g., a respective one of rule sets 124 of FIG. 1) associated with the first geographic area 128*a* and a second rule set (e.g., a respective one of rule sets 124 of FIG. 1) associated with the first geographic area 128*a*. The first rule set (e.g., a respective one of rule sets 124 of FIG. 1) may comprise rules associated with security of the interactions performed by the user device 106 while in the first geographic area 128*a*. The second rule set (e.g., a respective one of rule sets 124 of FIG. 1) may comprise rules associated with security of the interactions performed by the user device 106 while in the second geographic area 128*b*. The first merged rule set (e.g., a respective one of merged rule sets 136 of FIG. 1) may comprise rules associated with security of the interactions performed by the user device 106 while in the first overlapping geographic area 132*a*. In certain embodiments, the interactions performed by the user device 106 include receiving location-based services over network 102.

In certain embodiments, generating the first merged rule set (e.g., a respective one of merged rule sets 136 of FIG. 1) comprises executing, by the processor 110 of the geofence management system 108, an artificial intelligence/machine learning (AI/ML) model 118 on the first rule set (e.g., a respective one of rule sets 124 of FIG. 1) and the second rule set (e.g., a respective one of rule sets 124 of FIG. 1). In certain embodiments, the AI/ML model 118 is configured to analyze the first rule set (e.g., a respective one of rule sets 124 of FIG. 1) and the second rule (e.g., a respective one of rule sets 124 of FIG. 1) set and remove redundant information from the first rule set (e.g., a respective one of rule sets 124 of FIG. 1) and the second rule set (e.g., a respective one of rule sets 124 of FIG. 1). The AI/ML model 118 may comprise one or more NLP models 122.

At operation 310, the processor 110 of the geofence management system 108 sends the first merged rule set (e.g., a respective one of merged rule sets 136 of FIG. 1) to a blockchain network 146 (see FIG. 1) for validation.

At operation 312, the processor 110 of the geofence management system 108 receives a notification 160 from the blockchain network 146 that the first merged rule set (e.g., a respective one of merged rule sets 136 of FIG. 1) is valid.

At operation 314, in response to receiving the notification 160 from the blockchain network 146 that the first merged rule set (e.g., a respective one of merged rule sets 136 of FIG. 1) is valid, the processor 110 of the geofence management system 108 stores the first merged rule set (e.g., a respective one of merged rule sets 136 of FIG. 1) in a memory 114 of the geofence management system 108.

At operation 316, the processor 110 of the geofence management system 108 determines that a user device 106 is located within the first geographic area 128*a* but not within the first overlapping geographic area 132*a*. In certain embodiments, the processor 110 of the geofence management system 108 determines a location of the user device 106 based at least in part upon GPS coordinates of the user device 106 at a particular time.

In response to determining at operation 316 that the user device 106 is located within the first geographic area 128*a* but not within the first overlapping geographic area 132*a*, method 300 continues to operation 318. In certain embodiments, the processor 110 of the geofence management system 108 determines that the user device 106 is located within the first geographic area 128*a* but not within the first overlapping geographic area 132*a* based at least in part upon the GPS coordinates of the user device 106 in relation to the series of location coordinates of the first geographic boundary 130*a* and the series of location coordinates of the first merged geographic boundary 134*a*.

At operation 318, the processor 110 of the geofence management system 108 applies the first rule set (e.g., a respective one of rule sets 124 of FIG. 1) in conjunction with interactions performed by the user device 106 while in the first geographic area 128*a* but not located within the first overlapping geographic area 132*a*.

At operation 320, the processor 110 of the geofence management system 108 generates a first alert 126*a* (see FIG. 1) based on the first rule set (e.g., a respective one of rule sets 124 of FIG. 1). For example, the first alert 126*a* may comprise "You are entering a location prone to fraud."

At operation 322, the processor 110 of the geofence management system 108 sends a first message 140*a* with the first alert 126*a* to the user device 106. After performing operation 322, method 300 ends.

In response to determining at operation 316 that the user device 106 is not located within a portion of the first geographic area 128*a* that does not overlap with the second geographic area 128*b*, method 300 continues to operation 324. At operation 324, the processor 110 of the geofence management system 108 determines that the user device 106 is located within the second geographic area 128*b* but not within the first overlapping geographic area 132*a*.

In response to determining at operation 324 that the user device 106 is located within the second geographic area 128*b* but not within the first overlapping geographic area 132*a*, method 300 continues to operation 326. In certain embodiments, the processor 110 of the geofence management system 108 determines that the user device 106 is located within the second geographic area 128*b* but not within the first overlapping geographic area 132*a* based at least in part upon the GPS coordinates of the user device 106 in relation to the series of location coordinates of the second geographic boundary 130*b* and the series of location coordinates of the first merged geographic boundary 134*a*.

At operation 326, the processor 110 of the geofence management system 108 applies the second rule set (e.g., a respective one of rule sets 124 of FIG. 1) in conjunction with interactions performed by the user device 106 while in the second geographic area 128*b* but not located within the first overlapping geographic area 132*a*.

At operation 328, the processor 110 of the geofence management system 108 generates a second alert 126*b* (see FIG. 1) based on the second rule set (e.g., a respective one of rule sets 124 of FIG. 1). For example, the second alert 126*b* may comprise "You are entering a location prone to radio frequency attacks."

At operation 330, the processor 110 of the geofence management system 108 sends a second message 140*b* with the second alert 126*b* to the user device 106. After performing operation 330, method 300 ends.

In response to determining at operation 324 that the user device 106 is not located within a portion of the second geographic area 128*b* that does not overlap with the first geographic area 128*a*, method 300 continues to operation 332.

At operation 332, the processor 110 of the geofence management system 108 determines that the user device 106 is located within the first overlapping geographic area 132*a*. In certain embodiments, the processor 110 of the geofence management system 108 determines that the user device 106 is located within the first overlapping geographic area 132*a* based at least in part upon the GPS coordinates of the user device 106 in relation to the series of location coordinates of the first merged geographic boundary 134*a*.

In response to determining at operation 332 that the user device 106 is located within the first overlapping geographic area 132*a*, method 300 continues to operation 334. At operation 334, the processor 110 of the geofence management system 108 applies the first merged rule set (e.g., a respective one of merged rule sets 136 of FIG. 1) in conjunction with interactions performed by the user device 106 while in the first overlapping geographic area 132*a*.

At operation 336, the processor 110 of the geofence management system 108 generates a first merged alert 138*a* (see FIG. 1) based on the first merged rule set (e.g., a respective one of merged rule sets 136 of FIG. 1). In certain embodiments, the first merged alert 138*a* comprises merged information of the first alert 126*a* and the second alert 126*b*. For example, the first merged alert 138*a* may comprise "You are entering a location prone to fraud and radio frequency attacks."

At operation 338, the processor 110 of the geofence management system 108 sends the first merged alert 138*a* to the blockchain network 146 for validation.

At operation 340, the processor 110 of the geofence management system 108 receives a notification 160 from the blockchain network 146 that the first merged alert 138*a* is valid.

At operation 342, in response to receiving the notification 160 from the blockchain network 146 that the first merged alert 138a is valid, the processor 110 of the geofence management system 108 sends a third message 140d with the first merged alert 138a to the user device 106. After performing operation 342, method 300 ends.

At operation 344, the processor 110 of the geofence management system 108 monitors the first overlapping geographic area 132a and a third geographic area 128c (see FIG. 2B). The third geographic area 128c is defined by a third geographic boundary 130c (see FIG. 2B). The third geographic boundary 130c comprises a series of location coordinates. In certain embodiments, the monitoring process comprises executing by, the processor 110 of the geofence management system 108, an AI/ML model 118 (see FIG. 1) to monitor the first merged geographic boundary 134a and the third geographic boundary 130c. The AI/ML model 118 may comprise one or more neural network models 120 (see FIG. 1) such as a recurrent neural network (RNN).

At operation 346, the processor 110 of the geofence management system 108 determines that the first overlapping geographic area 132a overlaps with the third geographic area 128c.

At operation 348, in response to determining that the first overlapping geographic area 132a overlaps with the third geographic area 128c, the processor 110 of the geofence management system 108 defines a second overlapping geographic area 132b associated with a second merged geographic boundary 134b (see FIG. 2B). In certain embodiments, the second merged geographic boundary 134b comprises a portion of the first merged geographic boundary 134a and a portion of the third geographic boundary 130c.

At operation 350, the processor 110 of the geofence management system 108 generates a second merged rule set (e.g., a respective one of merged rule sets 136 of FIG. 1) for the second overlapping geographic area 132b by merging the first merged rule set (e.g., a respective one of merged rule sets 136 of FIG. 1) associated with the first overlapping geographic area 132a and a third rule set (e.g., a respective one of rule sets 124 of FIG. 1) associated with the third geographic area 128c. The third rule set (e.g., a respective one of rule sets 124 of FIG. 1) may comprise rules associated with security of the interactions performed by the user device 106 while in the third geographic area 128c. The second merged rule set (e.g., a respective one of merged rule sets 136 of FIG. 1) may comprise rules associated with security of the interactions performed by the user device 106 while in the second overlapping geographic area 132b.

In certain embodiments, generating the second merged rule set (e.g., a respective one of merged rule sets 136 of FIG. 1) comprises executing, by the processor 110 of the geofence management system 108, an AI/ML model 118 on the first merged rule set (e.g., a respective one of merged rule sets 136 of FIG. 1) and the third rule set (e.g., a respective one of rule sets 124 of FIG. 1). In certain embodiments, the AI/ML model 118 is configured to analyze the first merged rule set (e.g., a respective one of merged rule sets 136 of FIG. 1) and the third rule set (e.g., a respective one of rule sets 124 of FIG. 1) and remove redundant information from the first merged rule set (e.g., a respective one of merged rule sets 136 of FIG. 1) and the third rule set (e.g., a respective one of rule sets 124 of FIG. 1). The AI/ML model 118 may comprise one or more NLP models 122.

At operation 352, the processor 110 of the geofence management system 108 sends the second merged rule set (e.g., a respective one of merged rule sets 136 of FIG. 1) to the blockchain network 146 for validation.

At operation 354, the processor 110 of the geofence management system 108 receives a notification 160 from the blockchain network 146 that the second merged rule set (e.g., a respective one of merged rule sets 136 of FIG. 1) is valid.

At operation 356, in response to receiving the notification 160 from the blockchain network 146 that the second merged rule set (e.g., a respective one of merged rule sets 136 of FIG. 1) is valid, the processor 110 of the geofence management system 108 stores the second merged rule set (e.g., a respective one of merged rule sets 136 of FIG. 1) in the memory 114 of the geofence management system 108.

At operation 358, the processor 110 of the geofence management system 108 determines that the user device 106 is located within the third geographic area 128c but not within the second overlapping geographic area 132b.

In response to determining at operation 324 that the user device 106 is located within the third geographic area 128c but not within the second overlapping geographic area 132b, method 300 continues to operation 360. In certain embodiments, the processor 110 of the geofence management system 108 determines that the user device 106 is located within the third geographic area 128c but not within the second overlapping geographic area 132b based at least in part upon the GPS coordinates of the user device 106 in relation to the series of location coordinates of the third geographic boundary 130c and the series of location coordinates of the second merged geographic boundary 134b.

At operation 360, the processor 110 of the geofence management system 108 applies the third rule set (e.g., a respective one of rule sets 124 of FIG. 1) in conjunction with interactions performed by the user device 106 while in the third geographic area 128c but not located within the second overlapping geographic area 132b.

At operation 362, the processor 110 of the geofence management system 108 generates a third alert 126c (see FIG. 1) based on the second rule set (e.g., a respective one of rule sets 124 of FIG. 1). For example, the third alert 126c may comprise "You are entering a location with compromised WiFi hotspots."

At operation 364, the processor 110 of the geofence management system 108 sends a fourth message 140s with the third alert 126c to the user device 106. After performing operation 364, method 300 ends.

In response to determining at operation 358 that the user device 106 is not located within a portion of the third geographic area 128c that does not overlap with the first overlapping geographic area 132a, method 300 continues to operation 366.

At operation 366, the processor 110 of the geofence management system 108 determines that the user device 106 is located within the second overlapping geographic area 132b. In certain embodiments, the processor 110 of the geofence management system 108 determines that the user device 106 is located within the second overlapping geographic area 132b based at least in part upon the GPS coordinates of the user device 106 in relation to the series of location coordinates of the second merged geographic boundary 134b.

In response to determining at operation 366 that the user device 106 is located within the second overlapping geographic area 132b, method 300 continues to operation 368. At operation 368, the processor 110 of the geofence management system 108 applies the second merged rule set (e.g., a respective one of merged rule sets 136 of FIG. 1) in conjunction with interactions performed by the user device 106 while in the second overlapping geographic area 132b.

At operation 370, the processor 110 of the geofence management system 108 generates a second merged alert 138b (see FIG. 1) based on the second merged rule set (e.g., a respective one of merged rule sets 136 of FIG. 1). In certain embodiments, the second merged alert 138b comprises merged information of the first merged alert 138a and the third alert 126c. For example, the second merged alert 138b may comprise "You are entering a location prone to fraud, radio frequency attacks, and with compromised WiFi hotspots."

At operation 372, the processor 110 of the geofence management system 108 sends the second merged alert 138b to the blockchain network 146 for validation.

At operation 374, the processor 110 of the geofence management system 108 receives a notification 160 from the blockchain network 146 that the second merged alert 138b is valid.

At operation 376, in response to receiving the notification 160 from the blockchain network 146 that the second merged alert 138b is valid, the processor 110 of the geofence management system 108 sends a fifth message 140e with the second merged alert 138b to the user device 106. After performing operation 376, method 300 ends. In response to determining at operation 366 that the user device 106 is not located within the second overlapping geographic area 132b, method 300 ends.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system, comprising:
a memory configured to store:
   a first rule set associated with a first geographic area defined by a first geographic boundary; and
   a second rule set associated with a second geographic area defined by a second geographic boundary; and
a processor operably coupled to the memory and configured to:
   monitor the first geographic boundary of the first geographic area;
   monitor the second geographic boundary of the second geographic area;
   determine that a portion of the first geographic area overlaps with a portion of the second geographic area;
   in response to determining that the portion of the first geographic area overlaps with the portion of the second geographic area:
      define a first overlapping geographic area associated with a first merged geographic boundary, wherein the first merged geographic boundary comprises a portion of the first geographic boundary and a portion of the second geographic boundary;
      generate a first merged rule set for the first overlapping geographic area by merging the first rule set and the second rule set, wherein generating the first merged rule set comprises executing, by the processor, a machine learning model on the first rule set and the second rule set, wherein the machine learning model is configured to analyze the first rule set and the second rule set and remove redundant information from the first rule set and the second rule set;
      send the first merged rule set to a blockchain network, wherein the blockchain network validates the first merged rule set;
      in response to sending the first merged rule set, receive a notification from the blockchain network, wherein the notification indicates that the first merged rule set is validated; and
      in response to receiving the notification from blockchain network, store the first merged rule set in the memory;
   determine that a user device is located within the first geographic area but not located within the first overlapping geographic area;
   in response to determining that the user device is located within the first geographic area but not located within the first overlapping geographic area:
      apply the first rule set in conjunction with interactions performed by the user device while in the first geographic area but not located within the first overlapping geographic area;
      generate a first alert based on the first rule set; and
      send a first message with the first alert to the user device;
   determine that the user device is located within the second geographic area but not located within the first overlapping geographic area;
   in response to determining that the user device is located within the second geographic area but not located within the first overlapping geographic area:
      apply the second rule set in conjunction with interactions performed by the user device while in the second geographic area but not located within the first overlapping geographic area;
      generate a second alert based on the first rule set; and
      send a second message with the second alert to the user device;
   determine that the user device is located within the first overlapping geographic area; and
   in response to determining that the user device is located within the first overlapping geographic area:
      apply the first merged rule set in conjunction with interactions performed by the user device while in the first overlapping geographic area;

generate a first merged alert based on the first merged rule set, the first merged alert comprising merged information of the first alert and the second alert; and send a third message with the first merged alert to the user device.

2. The system of claim 1, wherein:

the memory is further configured to store a third rule set associated with a third geographic area defined by a third geographic boundary; and the processor is further configured to:

monitor the first merged geographic boundary of the first overlapping geographic area;

monitor the third geographic boundary of the third geographic area;

determine that a portion of the third geographic area overlaps with a portion of the first overlapping geographic area;

in response to determining that the portion of the third geographic area overlaps with the portion of the first overlapping geographic area:

define a second overlapping geographic area associated with a second merged geographic boundary, wherein the second merged geographic boundary comprises a portion of the first merged geographic boundary and a portion of the third geographic boundary;

generate a second merged rule set for the second overlapping geographic area by merging the first merged rule set and the third rule set; and store the second merged rule set in the memory;

determine that the user device is located within the second overlapping geographic area; and in response to determining that the user device is located within the second overlapping geographic area:

apply the second merged rule set in conjunction with interactions performed by the user device while in the second overlapping geographic area;

generate a second merged alert based on the second merged rule set, the second merged alert comprising merged information of the first merged alert and the third alert; and send a fourth message with the second merged alert to the user device.

3. The system of claim 1, wherein:

the first rule set comprises rules associated with security of the interactions performed by the user device while in the first geographic area;

the second rule set comprises rules associated with security of the interactions performed by the user device while in the second geographic area; and the first merged rule set comprises rules associated with security of the interactions performed by the user device while in the first overlapping geographic area.

4. The system of claim 1, wherein the interactions performed by the user device include receiving location-based services over a communication network.

5. The system of claim 1, wherein the processor determines a location of the user device based on GPS coordinates of the user device at a particular time.

6. The system of claim 1, wherein:

the first merged geographic boundary comprises a series of location coordinates; and the processor determines that the user device is located within the first overlapping geographic area based at least in part upon GPS coordinates of the user device in relation to the series of location coordinates of the first merged geographic boundary.

7. A method comprising:

monitoring a first geographic boundary of a first geographic area;

monitoring a second geographic boundary of a second geographic area;

determining that a portion of the first geographic area overlaps with a portion of the second geographic area;

in response to determining that the portion of the first geographic area overlaps with the portion of the second geographic area:

defining a first overlapping geographic area associated with a first merged geographic boundary, wherein the first merged geographic boundary comprises a portion of the first geographic boundary and a portion of the second geographic boundary;

generating a first merged rule set for the first overlapping geographic area by merging a first rule set and a second rule set, wherein the first rule set is associated with the first geographic area and the second rule set is associated with the second geographic area, wherein generating the first merged rule set comprises executing a machine learning model on the first rule set and the second rule set, wherein the machine learning model is configured to analyze the first rule set and the second rule set and remove redundant information from the first rule set and the second rule set;

sending the first merged rule set to a blockchain network, wherein the blockchain network validates the first merged rule set;

in response to sending the first merged rule set, receiving a notification from the blockchain network, wherein the notification indicates that the first merged rule set is validated; and in response to receiving the notification from blockchain network, storing the first merged rule set;

determining that a user device is located within the first geographic area but not located within the first overlapping geographic area;

in response to determining that the user device is located within the first geographic area but not located within the first overlapping geographic area:

applying the first rule set in conjunction with interactions performed by the user device while in the first geographic area but not located within the first overlapping geographic area;

generating a first alert based on the first rule set; and sending a first message with the first alert to the user device;

determining that the user device is located within the second geographic area but not located within the first overlapping geographic area;

in response to determining that the user device is located within the second geographic area but not located within the first overlapping geographic area:

applying the second rule set in conjunction with interactions performed by the user device while in the second geographic area but not located within the first overlapping geographic area;

generating a second alert based on the first rule set; and sending a second message with the second alert to the user device;

determining that the user device is located within the first overlapping geographic area; and in response to determining that the user device is located within the first overlapping geographic area:
applying the first merged rule set in conjunction with interactions performed by the user device while in the first overlapping geographic area;
generating a first merged alert based on the first merged rule set, the first merged alert comprising merged information of the first alert and the second alert; and
sending a third message with the first merged alert to the user device.

8. The method of claim 7, further comprising:
monitoring the first merged geographic boundary of the first overlapping geographic area;
monitoring a third geographic boundary of a third geographic area;
determining that a portion of the third geographic area overlaps with a portion of the first overlapping geographic area;
in response to determining that the portion of the third geographic area overlaps with the portion of the first overlapping geographic area:
defining a second overlapping geographic area associated with a second merged geographic boundary, wherein the second merged geographic boundary comprises a portion of the first merged geographic boundary and a portion of the third geographic boundary;
generating a second merged rule set for the second overlapping geographic area by merging the first merged rule set and the third rule set, wherein the third rule set is associated with the third geographic area; and
storing the second merged rule set;
determining that the user device is located within the second overlapping geographic area; and
in response to determining that the user device is located within the second overlapping geographic area:
applying the second merged rule set in conjunction with interactions performed by the user device while in the second overlapping geographic area;
generating a second merged alert based on the second merged rule set, the second merged alert comprising merged information of the first merged alert and the third alert; and
sending a fourth message with the second merged alert to the user device.

9. The method of claim 7, wherein:
the first rule set comprises rules associated with security of the interactions performed by the user device while in the first geographic area;
the second rule set comprises rules associated with security of the interactions performed by the user device while in the second geographic area; and
the first merged rule set comprises rules associated with security of the interactions performed by the user device while in the first overlapping geographic area.

10. The method of claim 7, wherein the interactions performed by the user device include receiving location-based services over a communication network.

11. The method of claim 7, further comprising determining a location of the user device based on GPS coordinates of the user device at a particular time.

12. The method of claim 7, wherein:
the first merged geographic boundary comprises a series of location coordinates; and
determining that the user device is located within the first overlapping geographic area comprises determining a location of the user device based at least in part upon GPS coordinates of the user device in relation to the series of location coordinates of the first merged geographic boundary.

13. A non-transitory computer-readable medium storing instructions that, when executed by one or more processors, cause the one or more processors to:
monitor a first geographic boundary of a first geographic area;
monitor a second geographic boundary of a second geographic area;
determine that a portion of the first geographic area overlaps with a portion of the second geographic area;
in response to determining that the portion of the first geographic area overlaps with the portion of the second geographic area:
define a first overlapping geographic area associated with a first merged geographic boundary, wherein the first merged geographic boundary comprises a portion of the first geographic boundary and a portion of the second geographic boundary;
generate a first merged rule set for the first overlapping geographic area by merging a first rule set and a second rule set, wherein the first rule set is associated with the first geographic area and the second rule set is associated with the second geographic area, wherein generating the first merged rule set comprises executing a machine learning model on the first rule set and the second rule set, wherein the machine learning model is configured to analyze the first rule set and the second rule set and remove redundant information from the first rule set and the second rule set;
send the first merged rule set to a blockchain network, wherein the blockchain network validates the first merged rule set;
in response to sending the first merged rule set, receive a notification from the blockchain network, wherein the notification indicates that the first merged rule set is validated; and
in response to receiving the notification from blockchain network, store the first merged rule set;
determine that a user device is located within the first geographic area but not located within the first overlapping geographic area;
in response to determining that the user device is located within the first geographic area but not located within the first overlapping geographic area:
apply the first rule set in conjunction with interactions performed by the user device while in the first geographic area but not located within the first overlapping geographic area;
generate a first alert based on the first rule set; and
send a first message with the first alert to the user device;
determine that the user device is located within the second geographic area but not located within the first overlapping geographic area;
in response to determining that the user device is located within the second geographic area but not located within the first overlapping geographic area:
apply the second rule set in conjunction with interactions performed by the user device while in the second geographic area but not located within the first overlapping geographic area;
generate a second alert based on the first rule set; and send a second message with the second alert to the user device;

determine that the user device is located within the first overlapping geographic area; and in response to determining that the user device is located within the first overlapping geographic area:

apply the first merged rule set in conjunction with interactions performed by the user device while in the first overlapping geographic area;

generate a first merged alert based on the first merged rule set, the first merged alert comprising merged information of the first alert and the second alert; and send a third message with the first merged alert to the user device.

14. The non-transitory computer-readable medium of claim 13, wherein the instructions, when executed by the one or more processors, further cause the one or more processors to:

monitor the first merged geographic boundary of the first overlapping geographic area;

monitor a third geographic boundary of a third geographic area;

determine that a portion of the third geographic area overlaps with a portion of the first overlapping geographic area;

in response to determining that the portion of the third geographic area overlaps with the portion of the first overlapping geographic area:

define a second overlapping geographic area associated with a second merged geographic boundary, wherein the second merged geographic boundary comprises a portion of the first merged geographic boundary and a portion of the third geographic boundary;

generate a second merged rule set for the second overlapping geographic area by merging the first merged rule set and the third rule set, wherein the third rule set is associated with the third geographic area; and store the second merged rule set;

determine that the user device is located within the second overlapping geographic area; and in response to determining that the user device is located within the second overlapping geographic area:

apply the second merged rule set in conjunction with interactions performed by the user device while in the second overlapping geographic area;

generate a second merged alert based on the second merged rule set, the second merged alert comprising merged information of the first merged alert and the third alert; and send a fourth message with the second merged alert to the user device.

15. The non-transitory computer-readable medium of claim 13, wherein:

the first rule set comprises rules associated with security of the interactions performed by the user device while in the first geographic area;

the second rule set comprises rules associated with security of the interactions performed by the user device while in the second geographic area; and the first merged rule set comprises rules associated with security of the interactions performed by the user device while in the first overlapping geographic area.

16. The non-transitory computer-readable medium of claim 13, wherein the interactions performed by the user device include receiving location-based services over a communication network.

17. The non-transitory computer-readable medium of claim 13, further comprising determining a location of the user device based on GPS coordinates of the user device at a particular time.

* * * * *